March 10, 1959 J. W. MUEHLNER 2,877,413
METHOD OF MEASURING RECURRENT PULSE
TIME INTERVALS
Filed April 5, 1954 3 Sheets-Sheet 1

INVENTOR.
JOACHIM W. MUEHLNER
BY
AGENT —
ATTORNEY

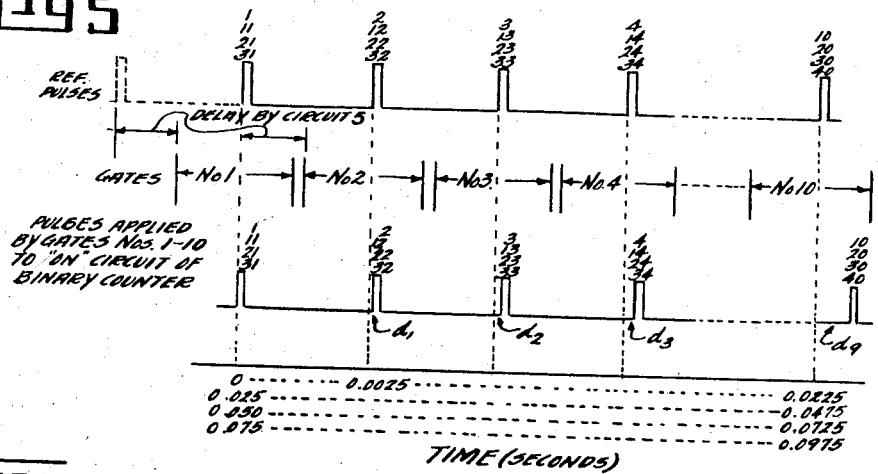
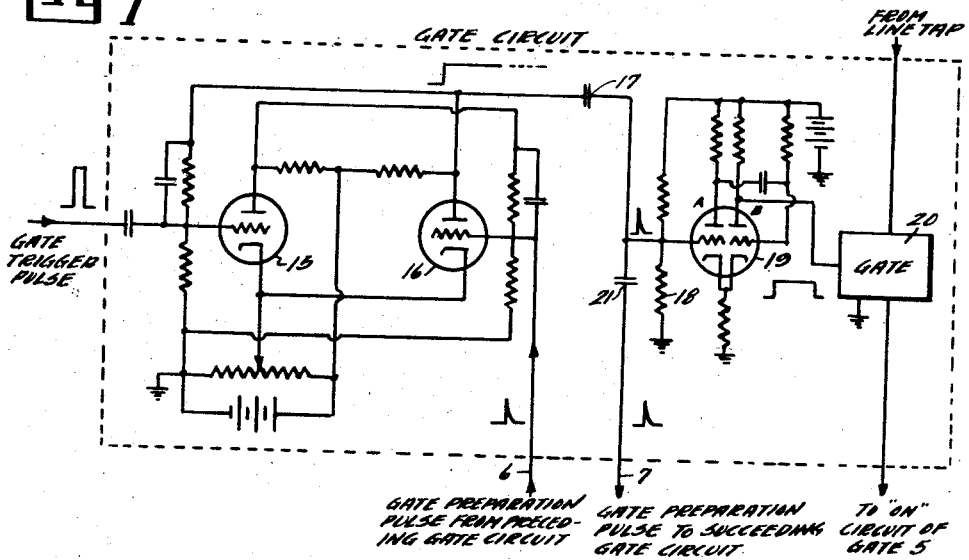
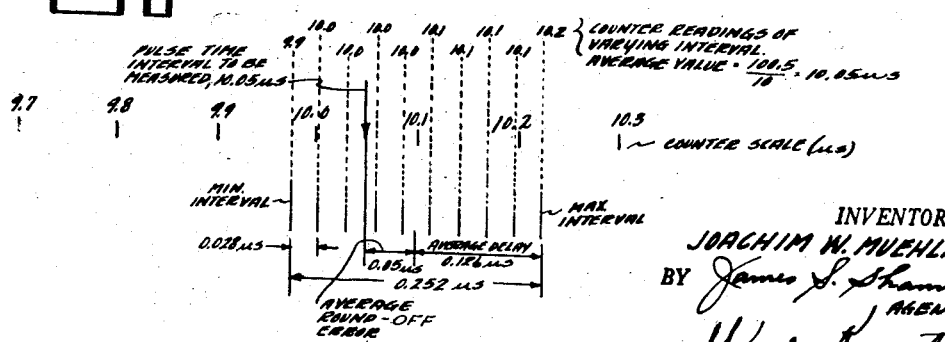

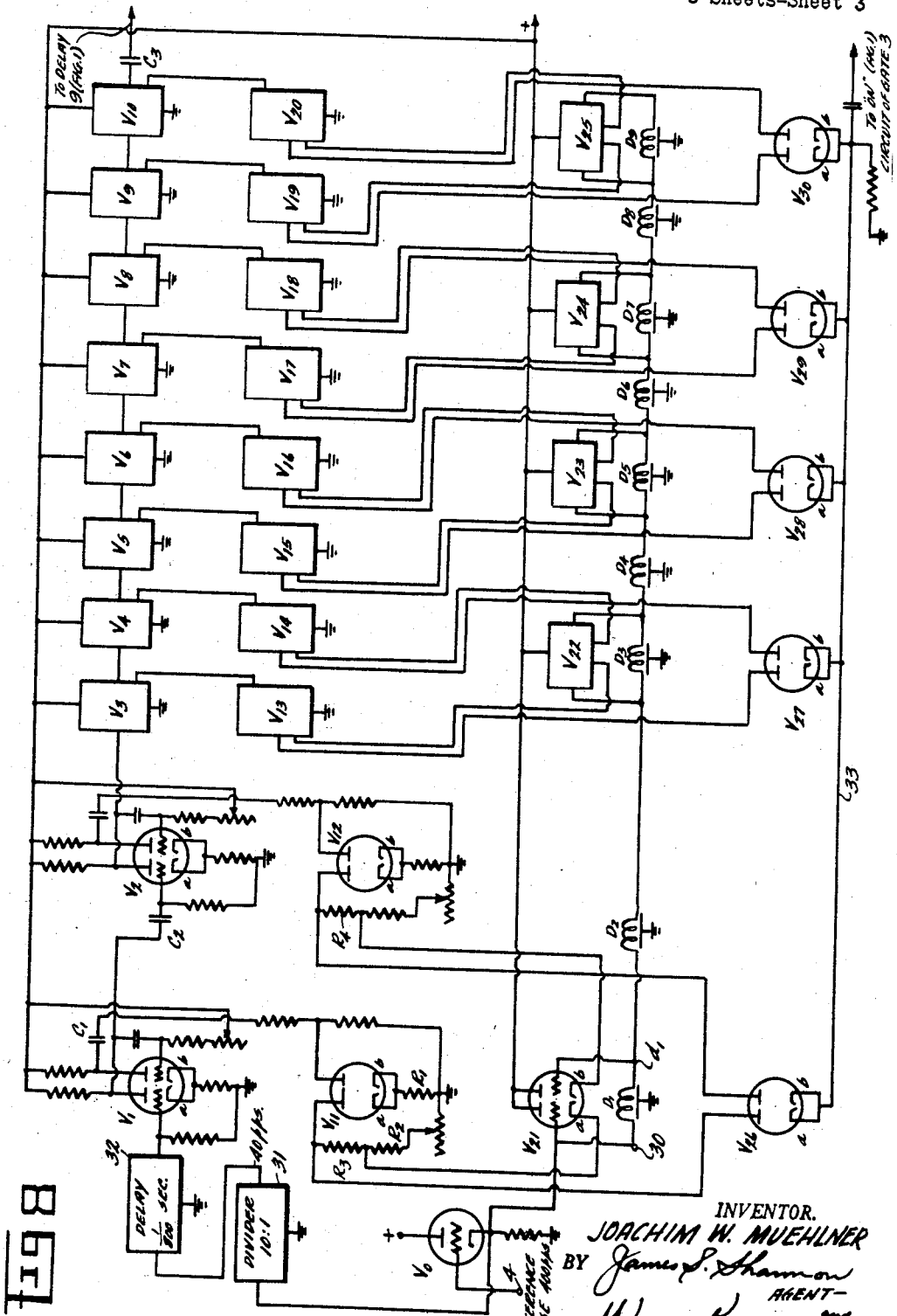

United States Patent Office 2,877,413
Patented Mar. 10, 1959

2,877,413

METHOD OF MEASURING RECURRENT PULSE TIME INTERVALS

Joachim W. Muehlner, Alamogordo, N. Mex., assignor to the United States of America as represented by the Secretary of the Air Force Application April 5, 1954, Serial No. 421,208

8 Claims. (Cl. 324—68)

The invention described herein may be manufactured and used by or for the Government for governmental purposes without payment to me of any royalty thereon.

This invention relates to devices which convert recurrent pulse time interval information into digital form and has as its object the reduction of the round-off error that occurs in such conversions. Although not limited to radar range pulse data conversion, such use will serve as a basis for explaining the invention in the subsequent specification.

The conversion from pulse position to digital form is normally achieved by counting the cycles of a highly stable oscillator during the time between the reference pulse and the information pulse. This counting may be done by means of a binary counter. Counters for frequencies up to 10 mc. have been built and if such a counter in connection with a 10 mc. constant frequency oscillator were used for the above purpose the time between reference pulse and information pulse could be determined to an accuracy of 0.1 $\mu s.$, which is the smallest counter digit and therefore the maximum round-off error.

In accordance with the invention it is proposed to reduce this round-off error by averaging successive measurements over a sampling period during which the time relation between reference pulse and information pulse is modified through the introduction of an artificial time delay having a predetermined cyclic variation synchronized with the sampling period. Either the reference pulse or the information pulse may be delayed, the measured intervals being decreased in the first case and increased in the second case. The measured time interval between reference and information pulses is also modified by a constant delay equal to the sum of the average delay introduced during the sampling period and the average round-off error. The constant delay is so introduced as to have an effect on the measured interval that is opposite to that of the varying delay. By this process the residual round-off error becomes approximately equal to the smallest counter digit divided by the number of measurements made during one cycle of the delay variation. Also the error in the measured interval due to pulse jitter is reduced by a factor equal to the square root of the number of measurements averaged.

A more detailed description of the invention will be given in connection with the specific embodiment thereof shown in the accompanying drawings, in which:

Fig. 5 illustrates the operation of the variable delay function generating circuit of Fig. 1;

Fig. 6 illustrates the operation of a specific application of the invention using a linear delay function;

Fig. 7 illustrates a suitable circuit for the gates used in the delay circuit of Fig. 1; and Fig. 8 is a diagram of an alternative method of generating the delay function illustrated in Fig. 2;

Figure 1:
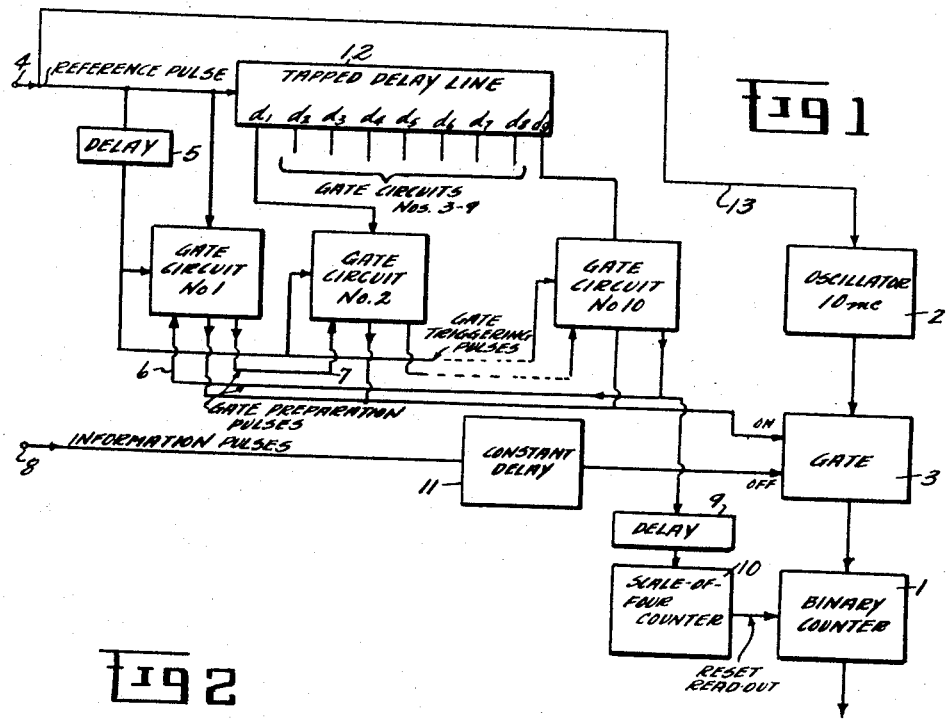
Fig. 1 is a block diagram of a circuit for measuring time intervals in accordance with the invention.

A circuit arrangement for reducing the round-off error by the proposed method is shown in Fig. 1. The binary counter 1 counts the cycles of stable oscillator 2 that are admitted to it during the time that gate 3 is open. The gate is opened by the reference pulse and closed by the information pulse. For maximum accuracy, the oscillator frequency and the reference pulse repetition frequency should be synchronized in order to establish a fixed phase relation between the oscillator counting frequency and the reference pulses. For this purpose the reference pulse are applied over circuit 13 to oscillator 2 which may be considered to contain the necessary apparatus for effecting this synchronization. In the radar application the reference pulse is synchronized with the transmitted pulse and the information pulse represents the received echo. The reference pulse is also applied to the input of a tapped delay line 12, or other delay producing device, capable of effecting a plurality of increasing delays. A gate circuit is provided for each delay output, including the zero delay output at the input of the delay element 12, through which the delayed reference pulse may be applied to the "On" circuit of gate 3. Gate circiuts Nos. 1–10 are identical and may be triggered by the reference pulse to produce a gate of fixed duration provided they have first been conditioned to respond to a trigger pulse by the application of a gate preparation pulse resulting from operation of the preceding gate. In this manner successive operation of the gates is achieved. Various gate circuits of this type are known, one example being that shown in Fig. 7 which will be explained later. The function of delay circuit 5 is to approximately center the gates relative to the delayed reference pulses. Since even the maximum delay $d_9$ is very small in comparison to the interval between reference pulses, delay 5 may equal one-half this interval.

Assume the circuit of Fig. 1 to be operating and the reference pulse just preceding the first reference pulse of a sampling period to be at terminal 4. Gate No. 1 will have been conditioned to respond to a trigger pulse by a gate preparation pulse applied over circuit 6 from previously operated gate No. 10. The condition of the gate circuits therefore is that gate No. 1 is sensitized and gates Nos. 2–10 are desensitized. The reference pulse, after a delay of one-half the pulse repetition interval by circuit 5, opens gate No. 1 but has no effect on the other gates. The next occurring reference pulse, which is the first pulse of the sampling period, is therefore applied without delay through gate No. 1 to the "On" circuit of gate 3 and opens the counter gate. Gate No. 1 closes after a predetermined interval and in so doing applies a gate preparation pulse to gate No. 2 over circuit 7. This interval is not critical, but it must lie between certain upper and lower limits. It must be short enough to end before the occurrence of the next reference pulse at the output of delay element 5, and it must be long enough to permit passage of a delayed reference pulse from line 12. The maximum reference pulse delay $d_9$ occurs in the case of gate No. 10 and therefore the interval, which is made the same for all gates, should be long enough to pass a reference pulse having a delay of $d_9$. The gate intervals and their relationships in time to both the undelayed and delayed reference pulses are illustrated in Fig. 5, which will be referred to later. Prior to the second reference pulse of the sampling period the first information pulse is applied to terminal 8 and after a constant delay by circuit 11, the purpose of which will be explained later, is applied to the "Off" circuit of counter gate 3 and closes this gate. During the time gate 3 was open counter 1, which had been reset prior to the sampling period, counted the cycles of oscillator 2 passing through the gate. The second reference pulse of the sampling period, after a delay of $d_1$, passes through gate No. 2, opened by the first reference pulse of the period, to the "On" circuit of counter gate 3, and so on until the tenth reference pulse, after a delay of $d_9$, is applied to the counter gate.

The sampling period may be terminated at this point after one complete cycle of the reference pulse delay function, or it may be extended to include two or more cycles. In the circuit of Fig. 1 the sampling period includes four cycles of the delay function. This is accomplished as follows: As already stated after each operation of gate No. 10 a gate preparation pulse is generated and applied over circuit 6 to gate No. 1. This pulse is also applied through delay circuit 9 to scale-of-four counter 10. After each fourth operation of gate No. 10 a pulse is aplied by counter 10 to the reset and read-out circuit of binary counter 1, which is then reset to zero and produces a digital output equal to the sum of the measurements made during the sampling period, in this case forty. Since the output equals the sum of the measurements it is proportional to their average value. Sufficient delay is provided by circuit 9 to prevent reset and read-out of the counter before the last information pulse has arrived.

The constant delay introduced by element 11 is necessary in order to compensate for the shortening of the measured interval by the variable time delay of the reference pulse. The correct delay for this compensation is the average delay applied to the reference pulses. The average delay will be one-half the maximum delay for delay functions symmetrical about the one-half value, such as linear or sinusoidal functions, which are preferred. For unsymmetrical functions the average delay will differ from one-half the maximum delay. Delay circuit 11 also compensates for the counter characteristic of rounding off to the next lower digit. To correct for this the measured interval is increased by one-half the maximum round-off error. The proper delay for element 11 is therefore the sum of these two corrections.

Figures 2, 3:
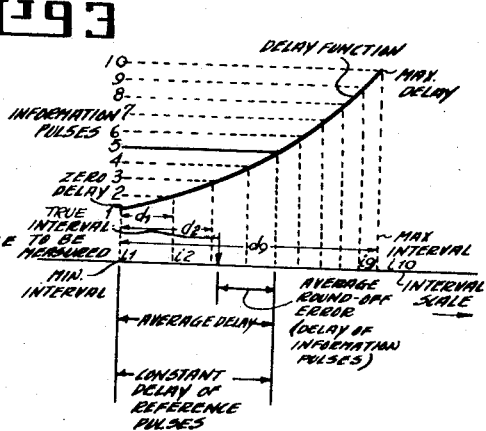
Figs. 2 and 3 illustrate the operation of the round-off error reducing circuit for the general case of a nonlinear nonsymmetrical delay function.

The above relationships are illustrated in Fig. 2 for the general case of a nonlinear nonsymmetrical delay function, with the variable delay applied to the reference pulses and the constant delay applied to the information pulses as in Fig. 1. The horizontal axis may be considered an interval scale, like the scale of a meter. The true interval to be measured is indicated on this scale by a labeled arrow. It is assumed in Fig. 2, as in Fig. 1, that ten reference pulses, numbered 1–10 in Fig. 2, occur during each cycle of the delay function. The graph representing the delay function, so labeled in Fig. 2, shows the effect of the variable delay on the reference pulses, the first reference pulse of the delay function cycle being subjected to zero delay, the second pulse to delay $d_1$, the third pulse to $d_2$, and eventually the tenth pulse to delay $d_9$. The cycle then repeats starting with the eleventh reference pulse. The average delay introduced by the delay function is shown as a solid line and is labeled in the figure. The constant delay, such as introduced by element 11 in Fig. 1, is the sum of the above mentioned average delay and the average round-off error, the latter being one-half the maximum round-off error. Since the effect of the constant delay of the information pulses is to lengthen the measured interval and since the effect of the variable delay of the reference pulses is to shorten the measured interval, the maximum interval measured occurs when the variable delay is zero and the minimum interval measured occurs when the variable delay has its maximum value, as indicated in Fig. 2. During one cycle of the delay function the interval measuring apparatus, comprising elements 1, 2 and 3 in Fig. 1, measures ten intervals indicated as $i_1, i_2, i_3 \ldots i_{10}$ in Fig. 2, $i_1$ and $i_{10}$ being the above mentioned maximum and minimum intervals. The average value of these measured intervals, taken over one or more delay function cycles, is the desired measurement of the interval in question.

Fig. 3 represents, in the same manner as Fig. 2, the situation when the variable delay is applied to the information pulses rather than to the reference pulses as was the case in Fig. 2. In this situation that part of the constant delay representing the average value of the variable delay must be applied to the reference pulses. However, that part of the constant delay equal to the average round-off error is again applied to the information pulses as in Fig. 2 since, for round-off to the lower side, this correction must always lengthen the measured interval. Since the variable delay lengthens the measured interval in the situation represented in Fig. 3 the maximum measured interval occurs at the maximum value of the variable delay and the minimum value at zero variable delay, which is the reverse of Fig. 2.

Fig. 6, which forms part of a numerical example to be discussed later, is similar in all respects to Fig. 2 except that a linear symmetrical delay function is employed and the curve of the delay function is therefore not illustrated as in Fig. 2. The vertical dotted lines, however, represent the intervals $i_1 \ldots i_{10}$ the same as in the foregoing figures. The interval scale along the horizontal axis, designated counter scale in Fig. 6, is laid off in 0.1 microsecond steps. The average round-off error is therefore one-half of this step or 0.05 microsecond. Further discussion of Fig. 6 is given in connection with the above mentioned numerical example.

It will be apparent from Figs. 2, 3, and 6 that, in effect, the variable delay, whether applied to the reference pulses or to the information pulses, causes the interval of time measured by the counter to vary about a value equal to the sum of the true time interval and the average round-off error, with the maximum deviation from this value equal to the average value of the delay function. The true time interval may be fixed during the sampling period or it may vary as a function of time as normally occurs in radar range measurements. In the latter case the interval of time presented to the counter gate changes from measurement to measurement by the artificial variable delay step plus the natural increment. During the short sampling period of 0.1 second, the natural rate of change of the true interval is assumed to be constant. The combination of natural and artificial delay increments under these circumstances acts practically in the same fashion as the artificial delay increment alone and need not be considered separately. If a natural rate of change of the true time interval is present the "true time interval" during the sampling period should be considered as the "true average time interval" during the sampling period.

Instead of delaying the reference or information pulses to compensate for the average change in the measured interval due to the variable delay, this compensation can be accomplished by an appropriate constant preset of the counter, a positive preset being required in the case of reference pulse delay and a negative preset in the case of information pulse delay. Compensation for the counter characteristic of rounding-off to the next lower digit is always effected by a positive preset.

Considering a specific example of the circuit of Fig. 1, assume that it is desired to convert radar range pulse information, having a pulse repetition frequency of 400, into digital form with the round-off error not exceeding the order of 0.01 $\mu$s.

Figure 4:
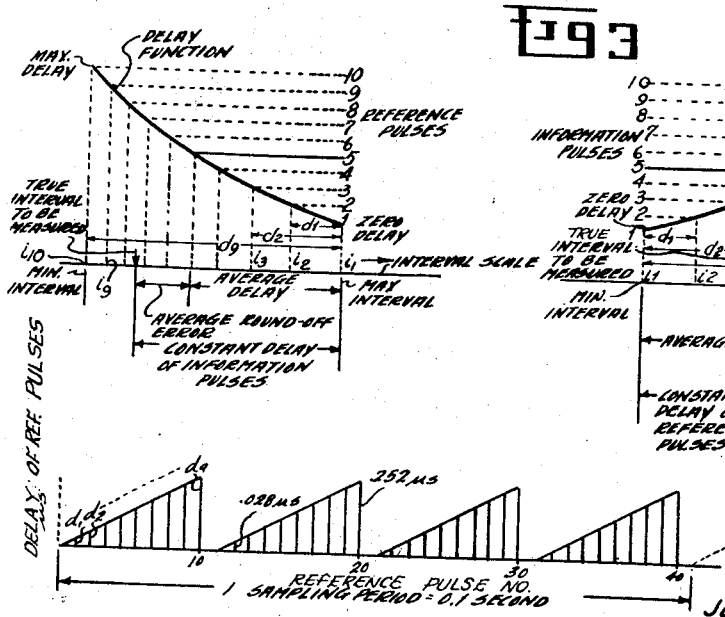
Fig. 4 illustrates a linear variable delay function.

With a pulse repetition frequency of 400 it is possible to average 40 measurements over a sampling period of 0.1 second, giving ten digital output readings from counter 1 per second. Using a linear 9-step delay of .028 $\mu$s. per step, such as may be produced by line 12 of Fig. 1 or the circuit of Fig. 8, the delay function will be as shown in Fig. 4. This figure shows the amount of delay applied to each of the forty reference pulses during the sampling period. The delay step should exceed the maximum possible change of the measured interval due to relative motion between the radar and the target during the pulse interval, so that a sufficient net delay is obtained even if the two influences oppose each other. For relative target velocities of 3600 feet per second or less, the net delay step may be anything between 0.008 μs. and 0.048 μs. Fig. 5 shows the time relationships between the reference pulses, the gates and the pulses applied to the "On" circuit of counter gate 3, with the delays $d_1$–$d_9$ greatly exaggerated, for the specific example being considered. For example, reference pulses 1, 11, 21 and 31 are subjected to no delay and pass through gate No. 1 to the "On" terminal of gate 3, reference pulses 2, 12, 22 and 32 are subjected to a delay of $d_1$ and pass through gate No. 2 to the "On" terminal, reference pulses 3, 13, 23 and 33 are subjected to a delay of $d_2$ and pass through gate No. 3 to the "On" terminal, etc.

The correct constant delay introduced by circuit 11 is equal to the sum of the average delay of the reference pulse and the average round-off error of the counter. The average delay is $$(0+1+2+3+4+5+6+7+8+9)0.028/10 = 0.126 \text{ μs.}$$

With an oscillator 2 frequency of 10 mc. the round-off error of the counter varies from 0 to 0.1 μs. and, therefore, its average value is 0.05 μs. The delay to be introduced by circuit 11 in this case is therefore 0.176 μs.

Fig. 6 illustrates the operation of the above circuit in measuring a pulse time interval of 10.05 μs. Due to the varying delay of the reference pulses the intervals measured by the counter range from a minimum of $$10.05 + 0.050 + 0.126 - 0.252 = 9.974 \text{ μs.}$$

to a maximum of $10.05 + 0.050 + 0.126 = 10.226$ μs. The average of the ten counter readings of these intervals, which readings are indicated at the top of the vertical dotted lines, is 10.05 μs. as compared to a reading of 10.0 that would have been obtained had not the above described method of reducing the round-off error been employed. The maximum round-off error, therefore, has been reduced from 0.1 μs. to approximately 0.01 μs. The use of four delay cycles enables the averaging of 40 intervals during the sampling period resulting in a reduction of the pulse jitter error by the factor $\sqrt{40}$. At the end of the sampling period the binary counter 1 reads out the sum of 40 measurements which is, of course, proportional to the average value of the measurements, the average value being within approximately ±0.01 μs. of the true value of the interval.

In Fig. 1, the delay circuits 5, 9 and 11, the counters 1 and 10, the oscillator 2 and gate circuits Nos. 1–10 are all components well known in the art and need not be described in detail here. An example of a suitable circuit for gates Nos. 1–10, however, is shown in Fig. 7. Referring to this figure, tubes 15 and 16 are connected in a conventional bistable multivibrator circuit. Assuming a condition of stability in which tube 15 is cut off and tube 16 is conducting, the application of a positive gate trigger pulse (from delay circuit 5) to the grid of tube 15 causes the circuit to switch to its other condition of stability in which tube 15 is conducting and tube 16 is cut off. This switching action is accompanied by a sharp rise in voltage on the anode of tube 16 which, when differentiated by condenser 17 and resistor 18, results in a positive trigger pulse on the grid of tube 19A. This pulse triggers the one-cycle multivibrator comprising tube 19 which generates a positive gate voltage of the desired duration at the anode of section B. The duration of this gate is determined by the discharge time constant of the condenser connected between the anode of section A and the grid of section B, and is adjusted to be within the previously defined limits. This voltage is used to operate any suitable gate 20 such, for example, as an over-biased vacuum tube stage. Returning to the multivibrator containing tubes 15 and 16, the condition of this circuit is now such that it will not respond to further trigger pulses until it is reverted to its original condition (tube 15 nonconductive and tube 16 conductive) by application of a gate preparation pulse to the grid of tube 16 from the next preceding gate circuit. The preparation pulse causes the circuit to switch to the condition in which tube 15 is nonconductive and thus renders it responsive to an applied trigger pulse. The gate preparation pulse for the next succeeding gate circuit is applied to that circuit through condenser 21.

Fig. 8 shows an alternative arrangement for producing the reference pulse variable delay function of Fig. 4. This circuit replaces delay circuit 5, delay line 12 and gates Nos. 1–10 of Fig. 1. Referring to Fig. 8 the reference pulse train is applied via terminal 4 and cathode follower $V_0$ to the input terminal 30 of a delay line consisting of nine equal delay sections $D_1$–$D_9$, to the grid of tube $V_{21a}$ and to frequency divider 31. Tubes $V_1$–$V_{10}$ are identical one-cycle multivibrators having a stable condition in which the "a" section is nonconductive and the "b" section is conductive. The 40 P. P. S. output of divider 31 is appled to the grid of $V_{1a}$ after being delayed 1/800 second, ½ the pulse interval, by network 32. The positive pulse triggers $V_1$ to its unstable condition, in which $V_{1a}$ is conductive and $V_{1b}$ nonconductive, where it remains for approximately 1/400 second. During the unstable period the charging current of $C_1$ flowing through $R_1$ in the cathode circuit of $V_{11}$ biases the cathode of $V_{11a}$ positive relative to its anode thereby preventing conduction in this section. Within approximately 1/800 second after the triggering of $V_1$ and during the time it is in its unstable condition, the next reference pulse appears on the grid of $V_{21a}$. Since the resulting pulse across $R_2$ is insufficient to overcome the bias on $V_{11a}$ there is no shunting effect from the diode and the pulse is applied through $R_3$ and $V_{26a}$ without delay to the output conductor 33 for application to the "on" of the counter gate 3 (Fig. 1). The pulse cannot subsequently be applied to conductor 33 through $V_{21b}$ or $V_{22ab}$–$V_{25ab}$ because of the shunting effect of diodes $V_{12a}$–$V_{20a}$ which are unbiased due to the fact that their associated multivibrators are in their stable states.

After 1/400 second in its unstable state multivibrator $V_1$ returns to its stable condition. The sharply rising voltage on the anode of $V_{1a}$ that accompanies this transition is applied through $C_2$ to the grid of $V_{2a}$ and triggers the multivibrator $V_2$ to its unstable condition. While $V_2$ is in its unstable condition the second reference pulse appears on the grid of $V_{21a}$. With $V_1$ in its stable condition there is no current flow through $R_1$ and $V_{11a}$ is not biased. Consequently its shunting action prevents the second reference pulse from being supplied directly to output conductor 33 through $V_{21a}$ and $V_{26a}$. Due to the unstable condition of $V_2$, however, $V_{12a}$ is biased to a nonconductive condition and the pulse is applied through $D_1$, $V_{21b}$, $R_4$ and $V_{26b}$ to the output circuit with a delay equal to $d_1$.

The above process continues automatically until multivibrator $V_{10}$ has operated and the tenth reference pulse, with a delay $d_9$, has been applied to conductor 33. Stages $V_3$–$V_{10}$ are identical to stages $V_1$ and $V_2$; stages $V_{13}$–$V_{20}$ are identical to stages $V_{11}$ and $V_{12}$, and stages $V_{22}$–$V_{25}$ are identical to stages $V_{21}$. The remaining steps in the cycle of operation are similar in all respects to those already described.

Concurrently with the tenth pulse, a pulse is applied from divider 31 to delay 32 and 1/800 second later to the grid of $V_{1a}$. This reinitiates the above described cycle with the 11th pulse being applied to the output circuit undelayed, the 12th having a delay of $d_1$, the 13th a delay of $d_2$, etc. The positive voltage rise in the anode of $V_{10a}$ during its transition to the stable condition may be applied through $C_3$ to delay network 9 and counter 10 of Fig. 1 for controlling the length of the sampling period.

I claim:

1. In apparatus for measuring a recurrent time interval by averaging the measurements thereof over a predetermined sampling period, means for reducing the round-off error in such measurement, said means comprising: means for increasing the lengths of the measured time intervals by the amount of the average round-off error of the measuring means; and means for varying the lengths of the measured intervals occurring during one sampling period about a value equal to the sum of said time interval and said average round-off error in accordance with a cyclic function of time having a period exactly divisible into said sampling period and synchronized therewith, the maximum deviation of said measured intervals from said fixed value being equal to the average value of said function.

2. Apparatus for measuring a recurrent time interval by averaging the measurements thereof over a predetermined sampling period, said apparatus comprising: a constant frequency oscillator; a counter capable of counting the cycles of said oscillator; gate means connected between said oscillator and said counter; means for opening said gate at the beginning of each interval and for closing it at the end thereof; and means for varying the lengths of the intervals occurring during one sampling period about a value equal to the algebraic sum of the true interval length and the average round-off error of said counter in accordance with a cyclic function of time synchronized with said sampling period.

3. Apparatus for measuring a recurrent time interval by averaging the measurements thereof over a predetermined sampling period, said apparatus comprising: a constant frequency oscillator; a counter capable of counting the cycles of said oscillator; gate means connected between said oscillator and said counter; means for opening said gate at the beginning of each interval and for closing it at the end thereof; and means for varying the lengths of the intervals occurring during one sampling period about a value equal to the algebraic sum of the true interval length and the average round-off error of said counter in accordance with a cyclic function of time synchronized with said sampling period, the maximum deviation of said intervals from said fixed value being equal to the average value of said function.

4. Apparatus for measuring a recurrent time interval by averaging the measurements thereof over a predetermined sampling period, said apparatus comprising: a constant frequency oscillator; a counter capable of counting the cycles of said oscillator; gate means connected between said oscillator and said counter; means for opening said gate at the beginning of each interval and for closing it at the end thereof; means for establishing a value of interval length equal to the algebraic sum of the true value of said interval and one-half the maximum round-off error of said counter; and means for varying the lengths of the intervals occurring during one sampling period about said value in accordance with a cyclic function of time having a period exactly divisible into said sampling period and synchronized therewith, the maximum deviation of said intervals from said fixed value being equal to the average value of said function.

5. Apparatus as claimed in claim 4 in which means are provided for establishing a fixed phase relation between the frequency of said oscillator and the beginning of said time interval.

6. Apparatus for measuring a recurrent time interval by averaging the measurements thereof over a predetermined sampling period, said time interval being defined by periodically recurring pairs of reference and information pulses, comprising: a constant frequency oscillator; a counter capable of counting the cycles of said oscillator; gate means connected between said oscillator and said counter; gate control means responsive to applied reference pulses for coincidently opening said gate and responsive to applied information pulses for coincidently closing said gate; means for delaying said information pulses before application to said gate control means by an amount equal to the average round-off error of said counter; means for variably delaying the pulses of one class occurring during said sampling period, before application to said gate control means, in accordance with a cyclic function of time having a period exactly divisible into said sampling period and synchronized therewith; and means for delaying the pulses of the other class occurring during said sampling period, before application to said gate control means, by a fixed amount equal to the average value of said function.

7. Apparatus as claimed in claim 6 in which the frequency of said oscilaltor is synchronized with the repetition frequency of said reference pulses.

8. Apparatus as claimed in claim 5 in which said function is linear.

References Cited in the file of this patent

UNITED STATES PATENTS 2,752,593   Downs ---------------- June 26, 1956

OTHER REFERENCES

The Review of Scientific Instruments, vol. 27, No. 1, March 1956, pp. 166–170, Weber et al.